United States Patent [19]

Domigan

[11] Patent Number: 5,030,795
[45] Date of Patent: Jul. 9, 1991

[54] LOW TENSION ACCESS HATCH

[75] Inventor: Charles N. Domigan, Coolville, Ohio

[73] Assignee: Butler Manufacturing Company, Kansas City, Mo.

[21] Appl. No.: 442,015

[22] Filed: Nov. 28, 1989

[51] Int. Cl.⁵ ............................................. H02G 3/14
[52] U.S. Cl. ....................................... 174/48; 49/397; 49/463; 220/337
[58] Field of Search .................... 174/48, 67; 220/242, 220/337; 439/142; 49/397, 463, 465

[56] References Cited

U.S. PATENT DOCUMENTS

| | | | |
|---|---|---|---|
| 2,968,689 | 1/1961 | Johnson | 174/48 |
| 3,140,344 | 7/1964 | Slater et al. | 439/142 X |
| 4,041,238 | 8/1977 | Penczak | 174/48 |
| 4,289,921 | 9/1981 | Gartner et al. | 174/48 |
| 4,864,078 | 9/1989 | Bowman | 174/48 |

Primary Examiner—Leo P. Picard
Assistant Examiner—David A. Tone
Attorney, Agent, or Firm—Frederick J. Olsson

[57] ABSTRACT

An access hatch for flush floor fitting assembly which is mounted by pivots comprising open ended slots and pins slidingly disposed in the slots. The pivots providing for the hatch to move between a closed position and any of a plurality of open positions and for the hatch, in any open position, to be lifted away from the assembly.

1 Claim, 1 Drawing Sheet

LOW TENSION ACCESS HATCH

This invention relates in general to electrical underfloor or infloor systems for high tension and low tension distribution in office buildings and the like and particularly relates to flush floor fitting assemblies employed with presets to provide low and high tension service to work stations on the floor.

More specifically, the invention relates to a highly improved low tension access hatch arrangement for the low tension opening in a flush floor fitting.

The principle object of the invention is to provide an access hatch arrangement wherein a single access hatch is structured to cover all of the low tension opening and is pivotally mounted so that it can be swung between a closed position to cover the low tension opening to any of a plurality of open positions wherein the low tension opening is uncovered and in any of such open positions the hatch can be lifted away so that the low tension opening and the entrance area are clear for activity inside the preset.

The invention will be described below in connection with the following drawings wherein.

Figure 1:
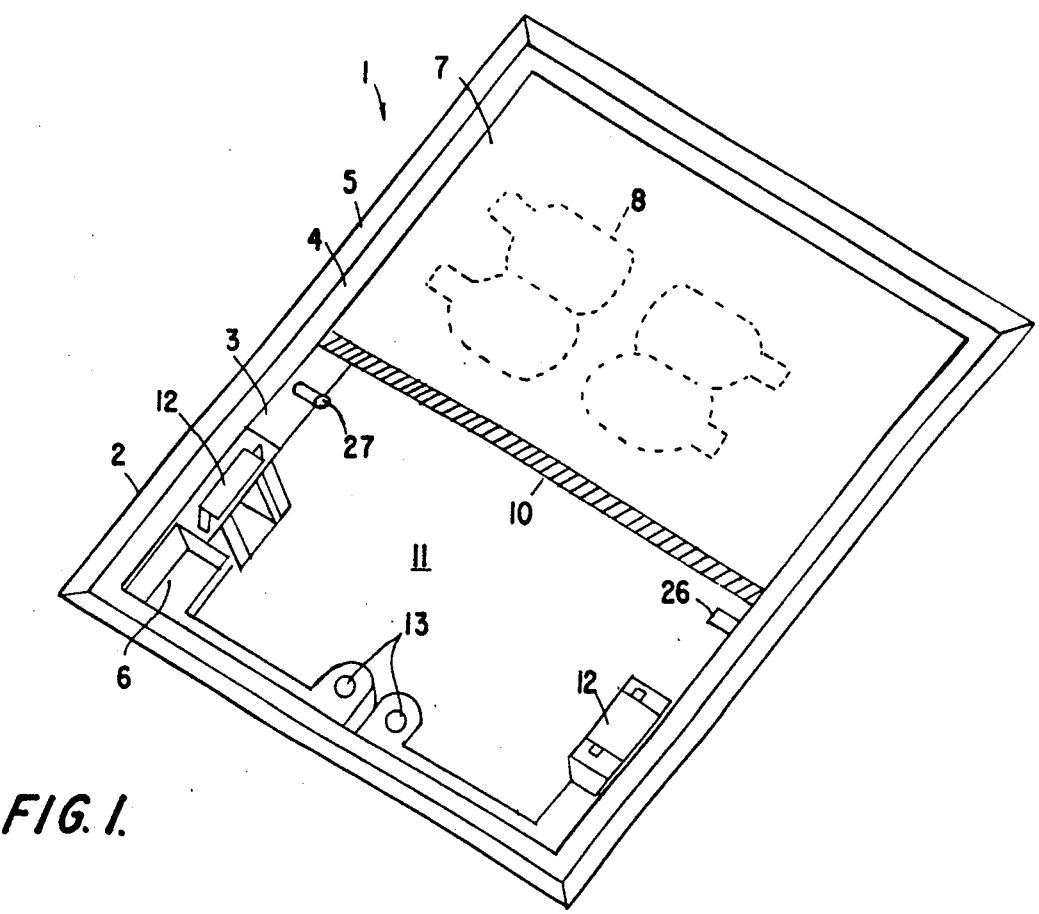
FIG. 1 is a perspective view of a low and high tension flush floor assembly employing the invention.

In FIG. 1 I have illustrated a high and low tension flush floor fitting which incorporates the invention on the low tension side.

The fitting 1 includes an essential flat annular shaped member 2 having a wall 3, a top flat surface 4, a tapered, outwardly extending flange 5 which overlies carpet or tile floor covering together with an inwardly extending shoulder means 6. The shoulder means 6 supports a power access plate 7 having flip lids 8 used to cover and uncover the access heads of duplex receptacles.

As will be observed, the wall 3 and shoulder 6 and the edge 10 of the power access plate form a low tension opening 11. The low tension opening 11 provides for the exit of low tension cables from the preset below and provide access space above the preset for the coupling of low tension jacks.

While I have illustrated the invention in connection with a high and low tension flush floor fitting, it will be evident that the invention is equally applicable to a flush floor fitting providing only low tension service at the work station. In such instances, the edge 10 would be formed similar to the wall 3 and flange 5 of the annular member 10 but without any shoulder means such as 6.

The shoulder means 6 is formed with cable management blocks 12 and with releasable holding means for securing the hatch in a closed position. One part of the holding means is noted at 13. The cable management blocks are disclosed in copending application Ser. No. 318,699 filed Mar. 3, 1989, now U.S. Pat No. 4,967,041, and the releasable holding means is disclosed in copending application Ser. No. 191,533 filed May 9, 1988 now U.S. Pat. No. 4,864,078. Both of these applications are assigned to the assignee of this invention.

Figure 2:
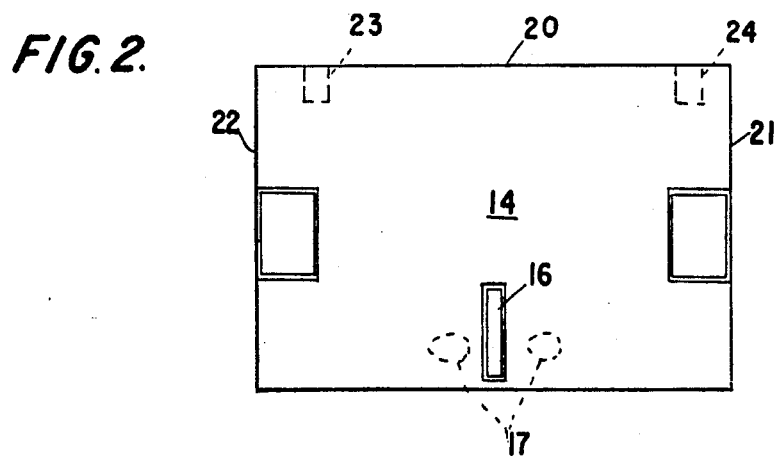
FIG. 2 is a plan view of the hatch employed in the assembly of FIG. 1.
Figure 3:
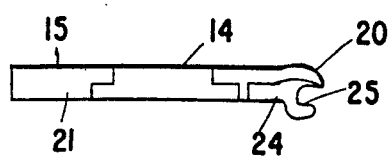
FIG. 3 is a side elevational view looking toward the left in FIG. 2.

With reference to FIGS. 2 and 3, the hatch 14 is rectangular in shape and has a flat top 15 which, when the hatch is in closed position, is flush with the top surface 4. The hatch carries the lift-up tab 16. The tab is disclosed in the above mentioned copending application Ser. No. 191,533. The underside of the hatch has strengthening ribs (not shown). The underside of the hatch also carries parts indicated at 17 which form part of the releasable holding means for securing the hatch in closed position. The edge 20 of the hatch has a downwardly extending clearance contour as particularly noted in FIG. 3.

The pivot means for mounting the hatch 14 on the annular member 2 will now be described.

Underneath the contoured edge 20 and respectively adjacent the edges 21 and 22 (normal to the edge 20) are short projections 23 and 24. These projections are formed with open ended pivot slots such as the slot 25 for the projection 24.

The wall 3 of the annular member carries pivot pins 26 and 27 which project into the low tension opening 11. The pivot pins 26 and 27 are adapted to be received in the pivot slots.

The pivot pins and slots are dimensioned so that there is a free sliding fit between the same. The sliding fit provides for the hatch to be quickly mounted on the pivot means and quickly lifted off the same.

In the full open position, the hatch extends upwardly just slightly off the vertical in a direction toward the power access plate so that the hatch can stand in the open position. In the closed position it is down against the shoulder means 6. The full open position is determined by the top surface 15 engaging the edge 10 of the access plate 7.

The sliding fit between the pivot slots and pivot pins provides for a gravity drop of the hatch from any open position. For example, if the hatch is in the full open position and nudged, it will freely rotate down until the projections engage the retainers. At that point the hatch is pushed downwardly until secured by the holding means.

In FIG. 1, the hatch has been lifted off the annular member 3 so that the low tension opening and the area around the member 3 is unobstructed.

I claim:

1. For a flush floor fitting:
    annular shaped means formed with a rectangular shaped low tension access opening;
    a rectangular shaped low tension access hatch having a top surface which is flat;
    along one edge of said access hatch, said top surface being downwardly contoured to form a clearance surface;
    adjacent said one edge, a pair of spaced apart projections, the projections being positioned below said clearance surface and extending in a direction inwardly from said one edge and downwardly from the clearance surface whereby, in plan, the projections are within the confines of the periphery of the access hatch;
    in each said projection, an open-ended pivot slot extending inwardly from said one edge, the open end of the pivot slot facing in a direction outwardly of the access hatch;
    a pair of pivot pins on said annular means and extending into said low tension opening, the pivot pins being received respectively in said open-ended slots and extending parallel said one edge;
    said pivot pins and said open ended pivot slots engaging in a sliding fit which provides for rotation of the access hatch between a closed position and of a plurality of open positions and for the access hatch, in any open position, to be lifted away from said annular member.

* * * * *